(12) United States Patent
Hopwood et al.

(10) Patent No.: US 7,286,209 B1
(45) Date of Patent: Oct. 23, 2007

(54) GENERATION OF WIDEBAND HIGH POWER COHERENT OPTICAL RADAR SIGNALS

(75) Inventors: Francis W. Hopwood, Severna Park, MD (US); John H. Glezen, Woodbine, MD (US); Michael M. Fitelson, Columbia, MD (US); George R. Gray, Eldersburg, MD (US); Christopher M. Patrick, Sykesville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 73 days.

(21) Appl. No.: 11/346,156

(22) Filed: Feb. 3, 2006

(51) Int. Cl.
*G01C 3/08* (2006.01)
*H01S 3/10* (2006.01)
*H01S 3/13* (2006.01)

(52) U.S. Cl. .................. 356/4.01; 356/28; 372/26; 372/29.011

(58) Field of Classification Search ............... 356/4.01, 356/5.01, 5.15, 28, 28.5; 372/21, 26, 29.011, 372/109; 359/237, 896; 342/195, 200, 202
See application file for complete search history.

(56) References Cited

U.S. PATENT DOCUMENTS

| | | | | |
|---|---|---|---|---|
| 5,740,190 A | * | 4/1998 | Moulton | ...................... 372/23 |
| 5,946,130 A | * | 8/1999 | Rice | ........................... 359/349 |
| 5,991,316 A | * | 11/1999 | Kikuchi | ....................... 372/21 |
| 6,115,114 A | * | 9/2000 | Berg et al. | ................. 356/5.13 |
| 2006/0013270 A1 | * | 1/2006 | Yumoto et al. | ............... 372/21 |
| 2006/0139620 A1 | * | 6/2006 | Hopwood et al. | ........ 356/5.15 |

* cited by examiner

*Primary Examiner*—Isam Alsomiri
(74) *Attorney, Agent, or Firm*—Andrews Kurth LLP (57) ABSTRACT

An arrangement for generating a high power optical radar beam. The arrangement includes first and second laser sources each having a first laser for generating an optical beam of a relatively low frequency F1 and a second laser for generating an optical beam of relatively higher frequency F2. Each laser source provides a first optical beam of frequency F2 and a second optical beam of frequency F1+F2. The arrangement also includes first and second waveform generators each having a modulator and a mixer. A first waveform generator receives the optical beams from the first laser source and a modulation signal for modulating the F1+F2 optical beam. The first waveform generator is operative to provide an output optical beam of frequency F1 having all of the modulation applied to the optical beam of frequency F1+F2. A phase comparator receives the outputs from the waveform generators and if they deviate in phase, a feedback device applies a corrective signal to the modulator of the second waveform generator until the two output signals are identical. When they are identical, the phase comparator is operable to provide an output optical beam which is the coherent addition of its two input optical beams.

16 Claims, 6 Drawing Sheets

GENERATION OF WIDEBAND HIGH POWER COHERENT OPTICAL RADAR SIGNALS

BACKGROUND OF THE INVENTION

1. Field of the Invention

The invention in general relates to optical radar systems and more particularly, to the generation of an optical beam therefor.

2. Description of Related Art

A system which transmits and receives electromagnetic radiation at optical frequencies is known by various names such as LIDAR, LADAR, laser radar and optical radar. The source of radiation in an optical radar system is a laser which transmits radiation generally in the low to high THz (terahertz) region.

A typical RF radar used for air-to-ground operations might transmit a waveform with a 1 GHz (gigahertz) bandwidth at an average power level of around 100 watts. An optical radar offers significant improvement in bandwidth because of its much higher frequency of operation in the high THz region.

In the operation of a typical radar, RF or optical, a narrow pulse provides a higher resolution than a wide pulse, however a wide pulse provides for higher energy and therefore a greater range. These two inconsistencies are resolved by a technique known as pulse compression. That is, a wide pulse which has a predetermined modulation is transmitted and the return pulse is compressed to achieve the resolution desired.

In an optical radar such modulation of higher frequencies is achieved more readily over the lower frequencies, however such higher frequencies are not amenable to long range transmissions because of absorption by water vapor, carbon dioxide and particulate matter in the atmosphere. The lower frequencies are not affected as much by these airborne contaminates. The present invention provides for an optical radar system which modulates high frequency optical signals and transmits an output signal which combines a plurality of lower frequency optical signals, resulting in a high power output signal substantially unaffected by atmospheric contamination.

SUMMARY OF THE INVENTION

A coherent generator of optical radar signals includes at least first and second laser sources each providing first and second output optical beams of respective frequencies F2 and F1+F2, where F1 is a relatively low frequency and F2 is a relatively higher frequency. These signals are provided as inputs to respective waveform generators, a first of which is provided with a modulation signal and is operable to provide an output modulated optical beam of frequency F1. A subsequent waveform generator provides an output optical beam of frequency F1 which is initially unmodulated. These two signals are provided as first and second inputs to a phase comparator. The phase comparator is operable to provide, at a first output, an optical beam signal to a feedback device which corrects the output of the subsequent waveform generator until it is in synchronism with the modulated signal from the first waveform generator. When the two inputs to the phase comparator are in synchronism a coherent output optical beam which is the sum of the two input beams is provided at a second output of the phase comparator. If only two laser sources and two waveform generators are used, the output of the phase comparator is provided to the T/R optics section of the radar for transmission through the atmosphere.

Further scope of applicability of the present invention will become apparent from the detailed description provided hereinafter. It should be understood, however, that the detailed description and specific example, while disclosing the preferred embodiment of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only, and wherein.

DESCRIPTION OF THE PREFERRED EMBODIMENT

Figure 1:
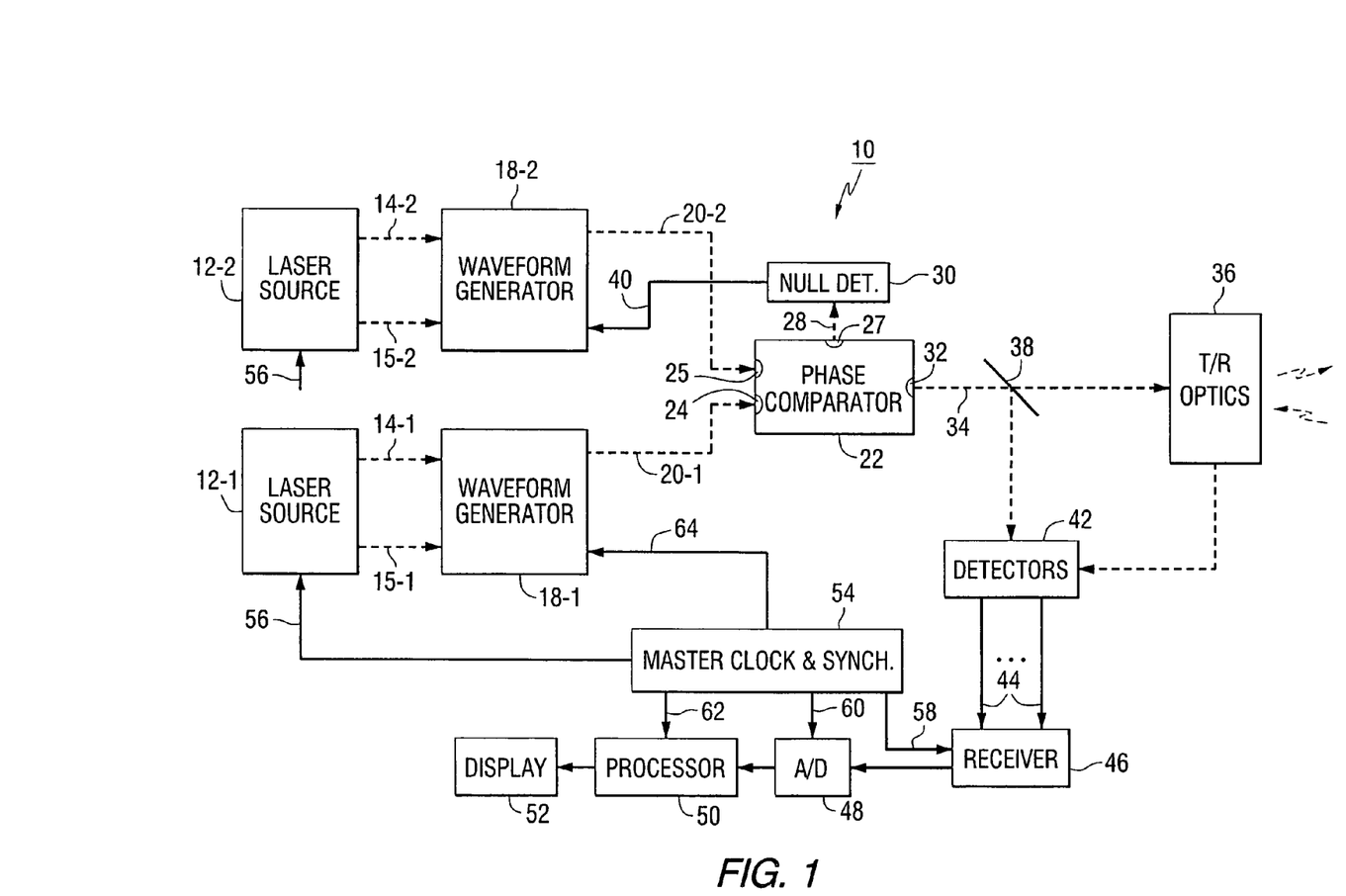
FIG. 1 is a block diagram of one embodiment of the present invention.

Referring now to FIG. 1, there is illustrated an optical radar system 10 having first and second identical laser sources 12-1 and 12-2. Laser source 12-1 provides first and second laser optical beams 14-1 and 15-1 to a wideband waveform generator 18-1, while laser source 12-2 provides first and second laser optical beams 14-2 and 15-2 to wideband waveform generator 18-2 which is identical to waveform generator 18-1. In the Figs. optical signals are shown dotted and electrical lines are shown solid.

Optical beams 20-1 and 20-2 generated by respective waveform generators 18-1 and 18-2 are provided to a phase comparator 22 at respective first and second inputs 24 and 25. Phase comparator 22 includes a first output 27 which provides optical beam 28 to a null detector 30, and additionally includes a second output 32 which provides an optical beam 34 which is the coherent addition of input optical beams 20-1 and 20-2. For the example of two laser sources, this optical beam 34 is provided to T/R (transmit/receive) optics section 36 via beamsplitter 38 for transmission through the atmosphere. A feedback device in the form of null detector 30 is operative to provide a feedback signal on line 40 to waveform generator 18-2 to ensure that the two optical beams 20-1 and 20-2 remain in synchronism so that they may be coherently added.

The remainder of the optical radar system 10 is comprised of conventional components well known to those skilled in the art. For example, the detectors 42 are coherent detectors which provide an output on one or more lines 44 that is the difference between the target return and a local oscillator signal constituted by optical beam 34 via beamsplitter 38. By means of lines 44, the output of the detectors 42 is provided to a receiver 46 for filtering out noise which would compete with the desired signals. The analog signal from the receiver 46 is converted to digital form in the A/D (analog to digital) converter 48 which is then sent to the processor 50. Processor 50 collects and manipulates the data in order to extract information from the return signals, which may include Fourier transforms, convolutions, corner turns, etc. A utilization means such as a display 52 may then be used for viewing the processed information.

The master clock and synchronizer 54 handles the timing needs of the optical radar system 10. This includes telling the laser sources 12-1 and 12-2 when to transmit, via line 56, the receiver 46 when to receive, via line 58 and the A/D converter 48 when to sample, via, line 60. It also tells the processor 50 when data are available for processing, via line 62. The master clock and synchronizer 54 also governs the modulation process used in the system by means of signals over line 64 going to the waveform generator 18-1.

Figure 2:
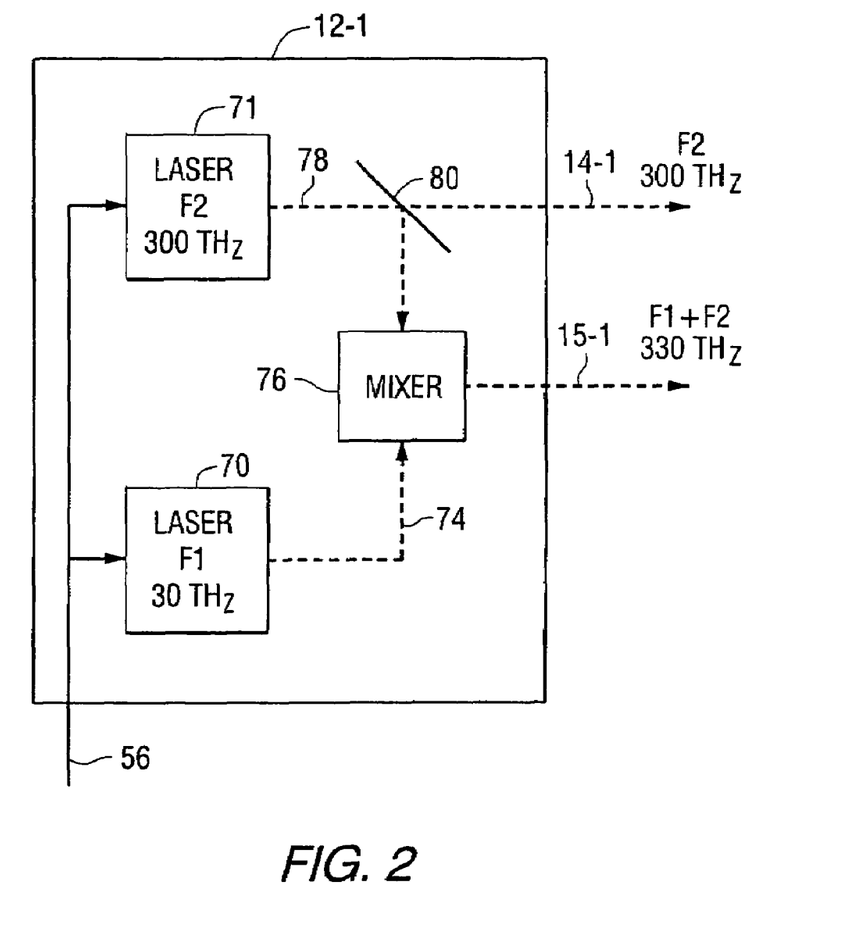
FIG. 2 is a block diagram of a laser source of FIG. 1.

FIG. 2 illustrates a typical laser source 12-1 which includes first and second lasers 70 and 71. Laser 70 provides an optical beam signal of relatively low frequency F1, while laser 71 provides an optical beam signal of relatively higher frequency F2. For purposes of discussion and by way of example, only, the frequency of laser 70 may be F1=30 THZ and that of laser 71, at least ten times that value, or F2=300 THz.

The high frequency 300 THz signal is used because wideband modulators for these high frequencies are plentiful and of high quality. The low frequency 30 THz signal is used because it is relatively unaffected by turbulence and other atmospheric phenomena.

The optical beam 74 from laser 70 is provided to a mixer 76, as is the optical beam 78 from laser 71, via beamsplitter 80. Mixer 76 is operative to mix the two beams to provide a resulting output beam which is the addition of the two input beams. That is, the output optical beam of mixer 76 is F1+F2, or 330 THz, and constitutes optical beam 15-1 of FIG. 1, while optical beam 78 of frequency F2, or 300 THz, constitutes optical beam 14-1 of FIG. 1.

Figure 3:
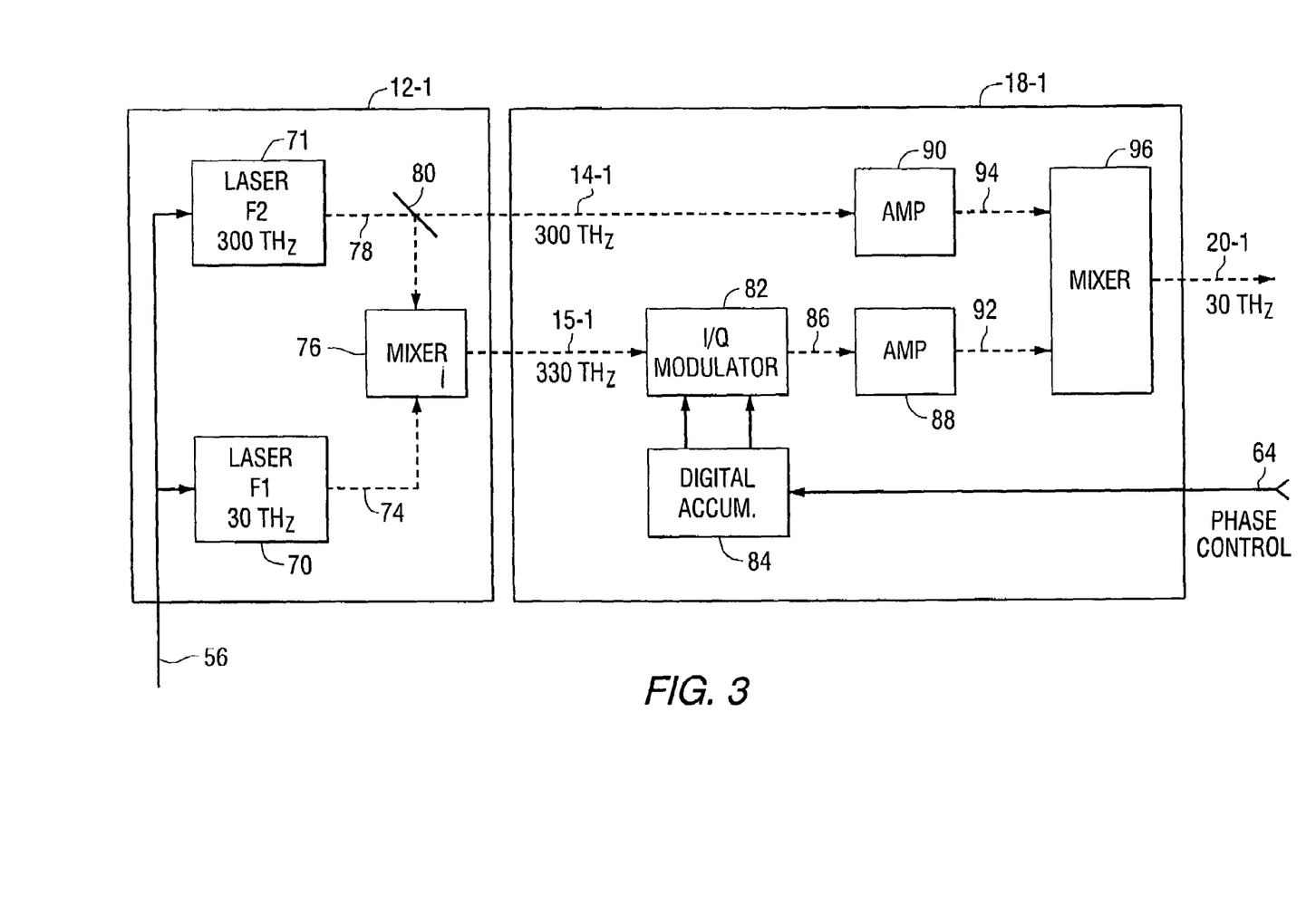
FIG. 3 is a block diagram of the wideband waveform generator of FIG. 1.

The two optical beams 14-1 and 15-1 from laser source 12-1 are provided to the waveform generator 18-1 as illustrated in FIG. 3. Waveform generator 18-1 includes a modulator such as I/Q modulator 82. A digital accumulator 84 converts the digital phase information on line 64 from master clock and synchronizer 54 into in-phase (I) and quadrature phase (Q) signals for operation of modulator 82.

The modulated high frequency (330 THz) optical beam 86 from modulator 82 is provided to a first amplifier 88 while optical beam 14-1 is provided to a second amplifier 90. The output optical beams 92 and 94 from respective amplifiers 88 and 90 go to a mixer 96, operative to provide the output optical beam 20-1 which is the difference between the 330 THz optical beam 92 and the 300 THz optical beam 94. That is, mixer 96 provides an output optical beam 20-1 which is 30 THz and which has the identical modulation which was applied to optical beam 15-1.

Figure 4:
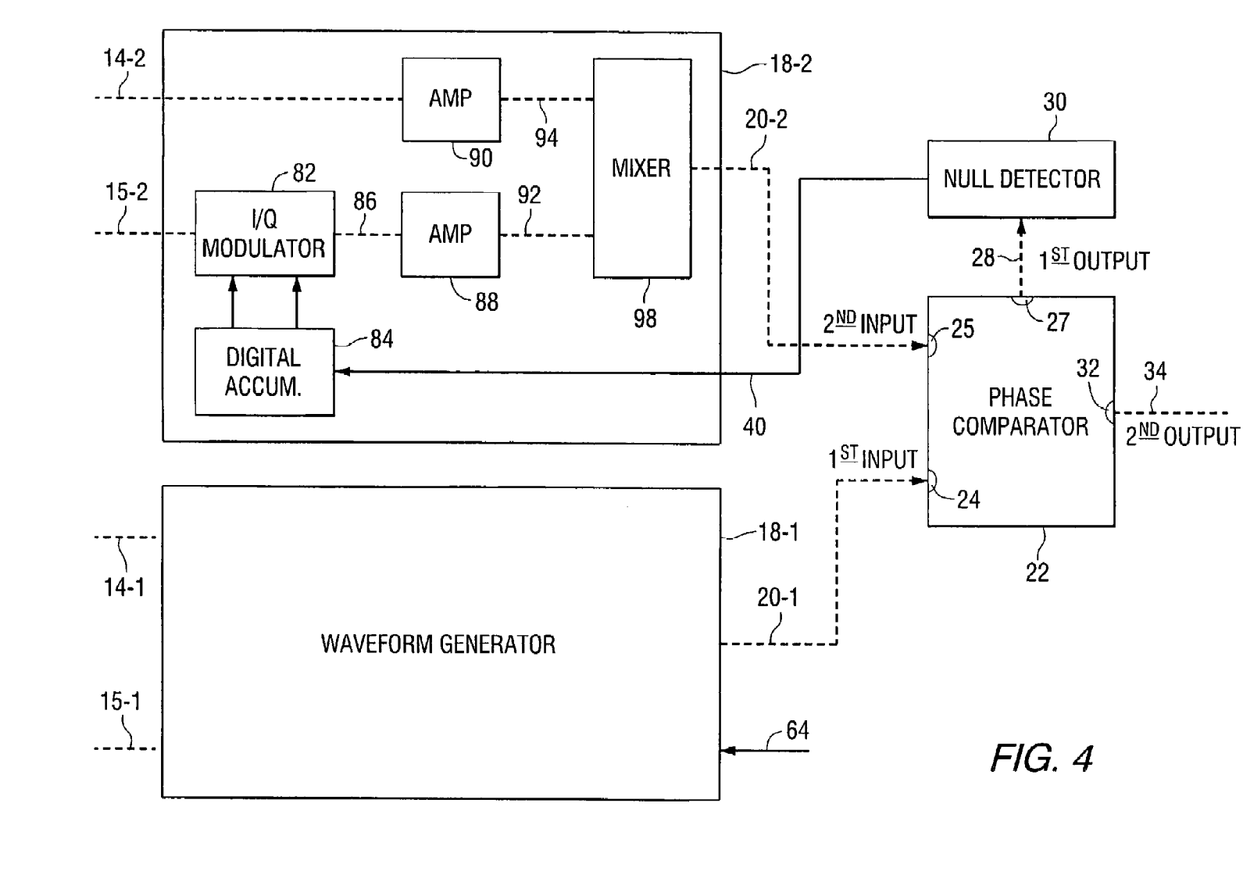
FIG. 4 illustrates the operation of the phase comparator of FIG. 1.

Operation of the phase comparator 22 may be best understood with reference to FIG. 4, which also shows the components of waveform generator 18-2. These components are identical to those of waveform generator 18-1. The modulated optical beam 20-1 from waveform generator 18-1 is provided to the first input 24 of phase comparator 22 while the optical beam 20-2 from waveform generator 18-2 is provided to the second input 25. Initially the waveforms of optical beams 20-1 and 20-2 will not be identical. This condition is sensed by phase comparator 22 resulting in a signal at first output 27 which is provided to null detector 30.

As a result of the optical beam 28 input to null detector 30 from first output 27, null detector 30 will provide a corresponding digital feedback signal on line 40 to the modulator 82 of waveform generator 18-2, via the digital accumulator 84. This feedback signal will result in the varying of phase of optical beam 20-2 until it is equal to that of optical beam 20-1. When this occurs both optical beams 20-1 and 20-2 will be exactly synchronized and are coherently added as optical beam 34 at the second output 32 of phase comparator 22. The output therefore is twice the power that would be provided by a single laser and of a relatively low frequency compatible with transmission through the atmosphere. If the optical beam 20-2 should start to deviate from its synchronized condition with optical beam 20-1, a signal will again be provided at first output 27 to null detector 30 for corrective action as before.

Figure 5:
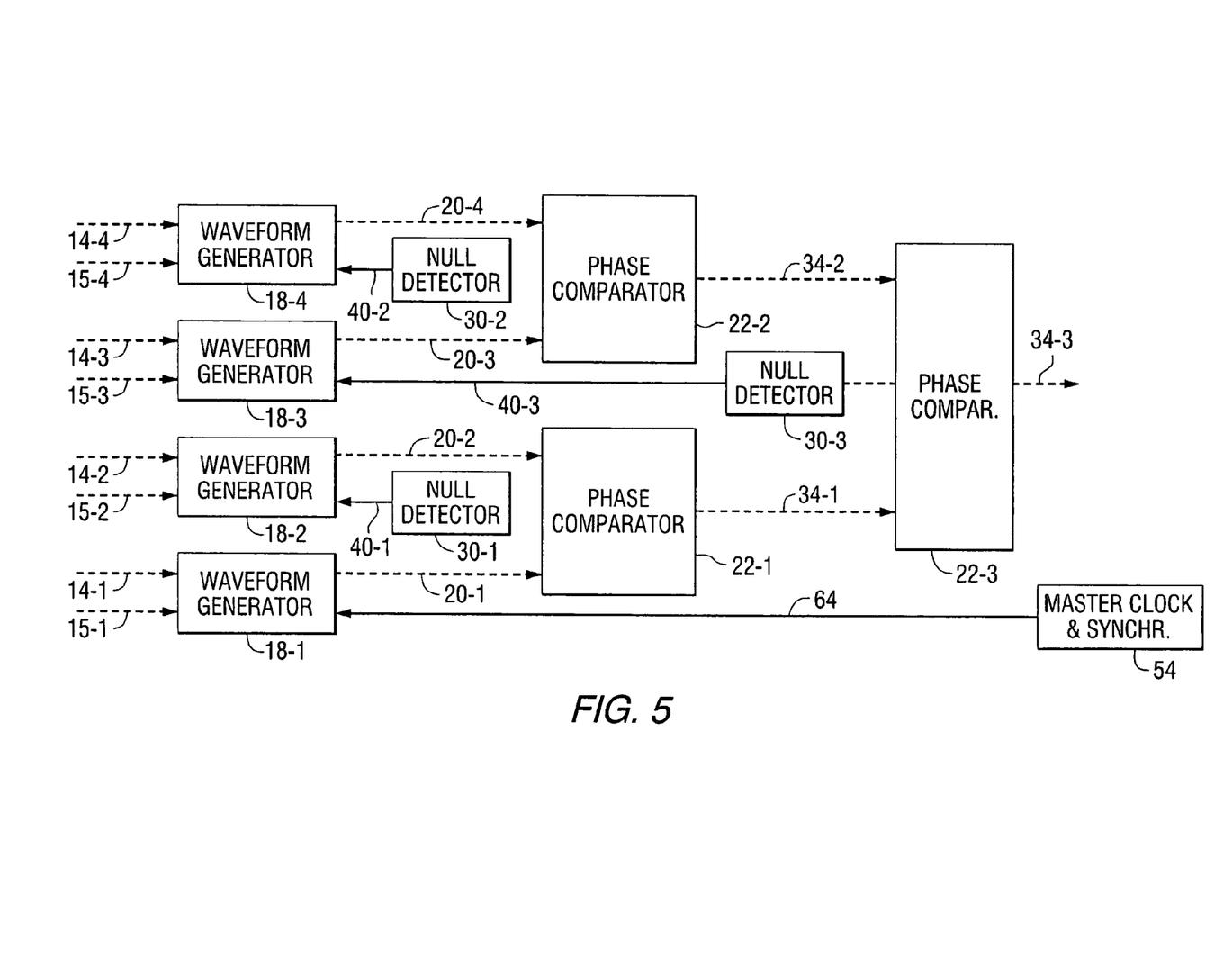
FIGS. 5 and 6 illustrate respective 4:1 and 8:1 signal combiner arrangements.
Figure 6:
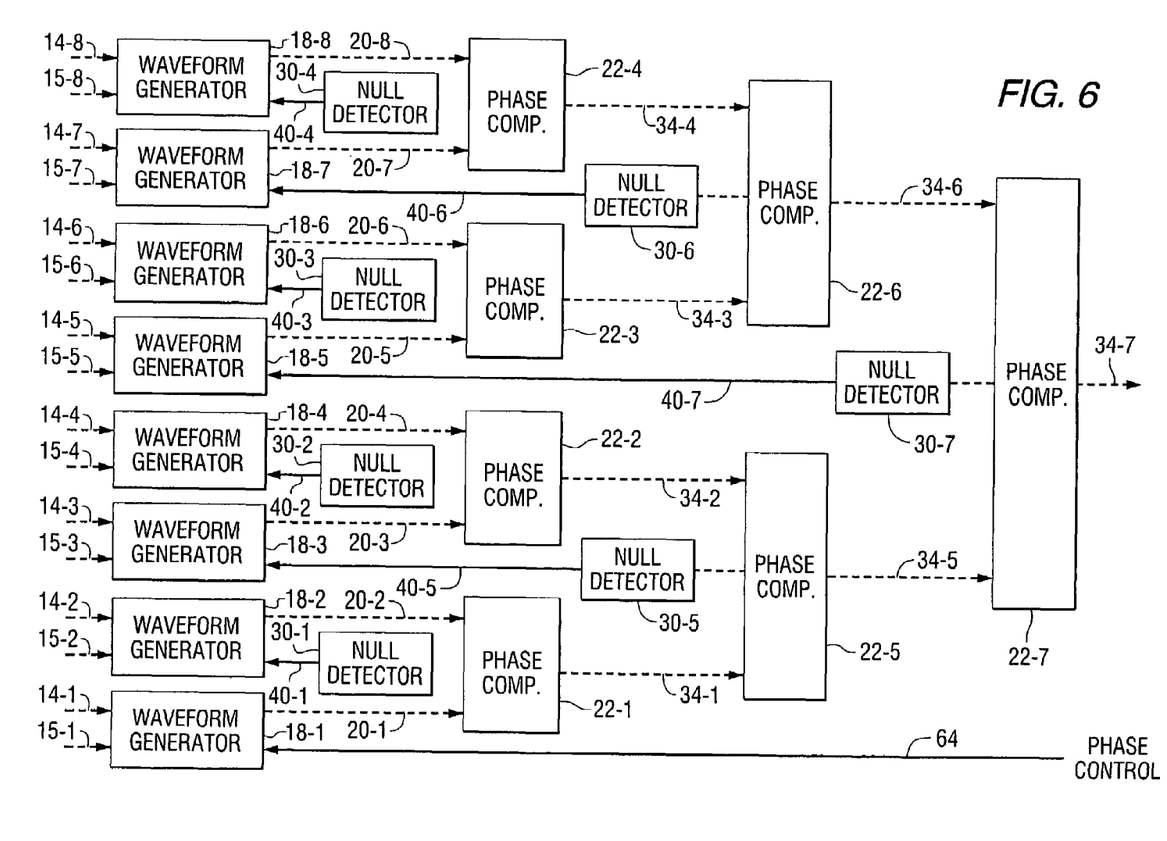

An even greater power output may be obtained by the arrangements illustrated in FIGS. 5 and 6. In the arrangement of FIG. 5, four waveform generators 18-1 to 18-4 are utilized. Input optical beams 14-1, 15-1 to 14-4, 15-4 are provided to respective waveform generators 18-1 to 18-4 from respective laser sources (not illustrated). The first two waveform generators 18-1 and 18-2, together with phase comparator 22-1 and null detector 30-1 operate as described with respect to FIG. 4 such that the optical beam 34-1 is the coherent addition of optical beams 20-1 and 20-2 with the desired modulation.

Initially, optical beam 34-1 will not be the same as optical beam 34-2 provided by phase comparator 22-2. This unbalance causes phase comparator 22-3, which receives these two signals, to provide an output signal to null detector 30-3. The feedback signal from null detector 30-3 tends to force optical beam 20-3 to conform to optical beam 34-1. From operation of phase comparator 22-2 and null detector 30-2 optical beam 20-4 will also be forced to follow. When optical beams 20-3 and 20-4 are equal, optical beam 34-2 from phase comparator 22-2 will be the coherent addition of optical beams 20-3 and 20-4 with all the modulation of optical beam 34-1. The output of phase comparator 22-3 therefore will be the coherent addition of all four optical beams resulting in a power output which is four times that of a single laser. By similar reasoning and operation, the arrangement of FIG. 6 which utilizes eight waveform generators, will provide an output optical beam which is eight times the power of a single laser.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. Apparatus for generating coherent optical radar signals, comprising:

at least first and second laser sources each including a first laser operable to provide an optical beam of a relatively low frequency F1, and a second laser operable to provide an optical beam of relatively higher frequency F2;

each said laser source being operable to provide first and second output optical beams of relative frequencies F2 and F1+F2;

at least first and second waveform generators, each including a modulator and a mixer;

each said first output optical beam of frequency F2 of each said laser source being provided to a respective said mixer of each said waveform generator;

each said second output optical beam of frequency F1+F2 of each said laser source being provided to a respective said modulator of each said waveform generator;

a source of modulation signal for providing a modulation signal to said modulator of only said first waveform generator to generate a modulated F1+F2 optical beam;

said modulated F1+F2 optical beam additionally being provided to said mixer;

said mixer of said first waveform generator being operable, as a result of mixing said optical beam of frequency F2 and said modulated optical beam of frequency F1+F2, to provide a modulated output optical beam of frequency F1;

said mixer of said second waveform generator being operable to provide an output optical beam of a frequency which is the difference between its two input optical beams;

at least one phase comparator having first and second inputs and first and second outputs;

the modulated optical beam of said mixer of said first waveform generator being provided to said first input of said phase comparator;

the optical beam of said mixer of said second waveform generator being provided to said second input of said phase comparator;

a feedback device for providing a feedback signal to said modulator of said second waveform generator;

said phase comparator being operable to provide an optical beam at said first output to said feedback device, which as a result, will generate said feedback signal to bring the phase of said output optical beam of said second waveform generator into synchronism with said modulated optical beam of said first waveform generator;

said phase comparator being additionally operable to provide at said second output, an output coherent optical beam which is the sum of said optical beams provided at its first and second inputs when said optical beams are in synchronism.

2. Apparatus according to claim 1 wherein:
said optical radar includes a T/R optics section; and
said output coherent optical beam from said phase comparator is provided to said T/R optics section.

3. Apparatus according to claim 1 wherein:
said laser sources each include a mixer;
said optical beam of frequency F1 and said optical beam of frequency F2 being provided to said mixer of said laser source;
said mixer being operable to provide an output optical beam which is the sum of the two optical beams provided to it.

4. Apparatus according to claim 1 wherein:
said modulator of each waveform generator is an I/Q modulator;
and which includes
a digital accumulator for converting input modulation commands into in-phase and quadrature components for said I/Q modulator.

5. Apparatus according to claim 1 wherein:
each said waveform generator includes first and second amplifiers;
each said first output optical beam of frequency F2 of each said laser source being provided to a respective first said amplifier of each said waveform generator prior to being provided to said mixer;
each of the outputs of said modulators of said waveform generators being provided to a respective second said amplifier prior to being provided to said mixer.

6. Apparatus according to claim 1 wherein:
said optical radar includes a master clock and synchronizer;
said master clock and synchronizer providing said modulation signal to said modulator of said first waveform generator.

7. Apparatus according to claim 1 wherein:
said feedback device is a null detector.

8. Apparatus according to claim 1 wherein:
said frequency F2 is at lest 10 times F1.

9. A method for generating coherent optical radar signals, comprising the steps of:
providing at least first and second laser sources each including a first laser operable to provide an optical beam of a relatively low frequency F1, and a second laser operable to provide an optical beam of relatively higher frequency F2;
combining said optical beams so that each said laser source is operable to provide first and second output optical beams of relative frequencies F2 and F1+F2;
providing at least first and second waveform generators, each including a modulator and a mixer;
providing each said first output optical beam of frequency F2 of each said laser source to a respective said mixer of each said waveform generator;
providing each said second output optical beam of frequency F1+F2 of each said laser source to a respective said modulator of each said waveform generator;
providing a modulation signal for said modulator of only said first waveform generator to generate a modulated F1+F2 optical beam;
providing said modulated F1+F2 optical beam to said mixer whereby said mixer of said first waveform generator is operable, as a result of mixing said optical beam of frequency F2 and said modulated optical beam of frequency F1+F2, to provide a modulated output optical beam of frequency F1 and said mixer of said second waveform generator is operable to provide an output optical beam of a frequency which is the difference between its two input optical beams;
providing at least one phase comparator having first and second inputs and first and second outputs;
providing the modulated optical beam of said mixer of said first waveform generator to said first input of said phase comparator;
providing the optical beam of said mixer of said second waveform generator to said second input of said phase comparator;
providing a feedback device for generating a feedback signal to said modulator of said second waveform generator whereby said phase comparator is operable to provide an optical beam at said first output to said feedback device, which as a result, will generate said feedback signal to bring the phase of said output optical beam of said second waveform generator into synchronism with said modulated optical beam of said first waveform generator and whereby said phase comparator is additionally operable to provide at said second output, an output coherent optical beam which is the sum of said optical beams provided at its first and second inputs when said optical beams are in synchronism.

10. A method according to claim 9 which includes the steps of:
providing a T/R optics section for said optical radar;
providing said output coherent optical beam from said phase comparator to said T/R optics section.

11. A method according to claim 9 which includes the steps of:
  providing each said laser sources with a mixer;
  providing said optical beam of frequency F1 and said optical beam of frequency F2 to said mixer of said laser source whereby said mixer is operable to provide an output optical beam which is the sum of the two optical beams provided to it.

12. A method according to claim 9 which includes the steps of:
  providing an I/Q modulator for each said waveform generator; and
  providing a digital accumulator for converting input modulation commands into in-phase and quadrature components for said I/Q modulator.

13. A method according to claim 9 which includes the steps of:
  providing each said waveform generator with first and second amplifiers;
  providing each said first output optical beam of frequency F2 of each said laser source to a respective first said amplifier of each said waveform generator prior to being provided to said mixer;
  providing each of the outputs of said modulators of said waveform generators to a respective second said amplifier prior to being provided to said mixer.

14. A method according to claim 9 which includes the step of:
  providing said optical radar with a master clock and synchronizer, said master clock and synchronizer providing said modulation signal to said modulator of said first waveform generator.

15. A method according to claim 9 which includes the step of:
  providing said feedback device in the form of a null detector.

16. A method according to claim 9 which includes the step of:
  providing a said frequency F2 which is at lest 10 times frequency F1.

* * * * *